UNITED STATES PATENT OFFICE.

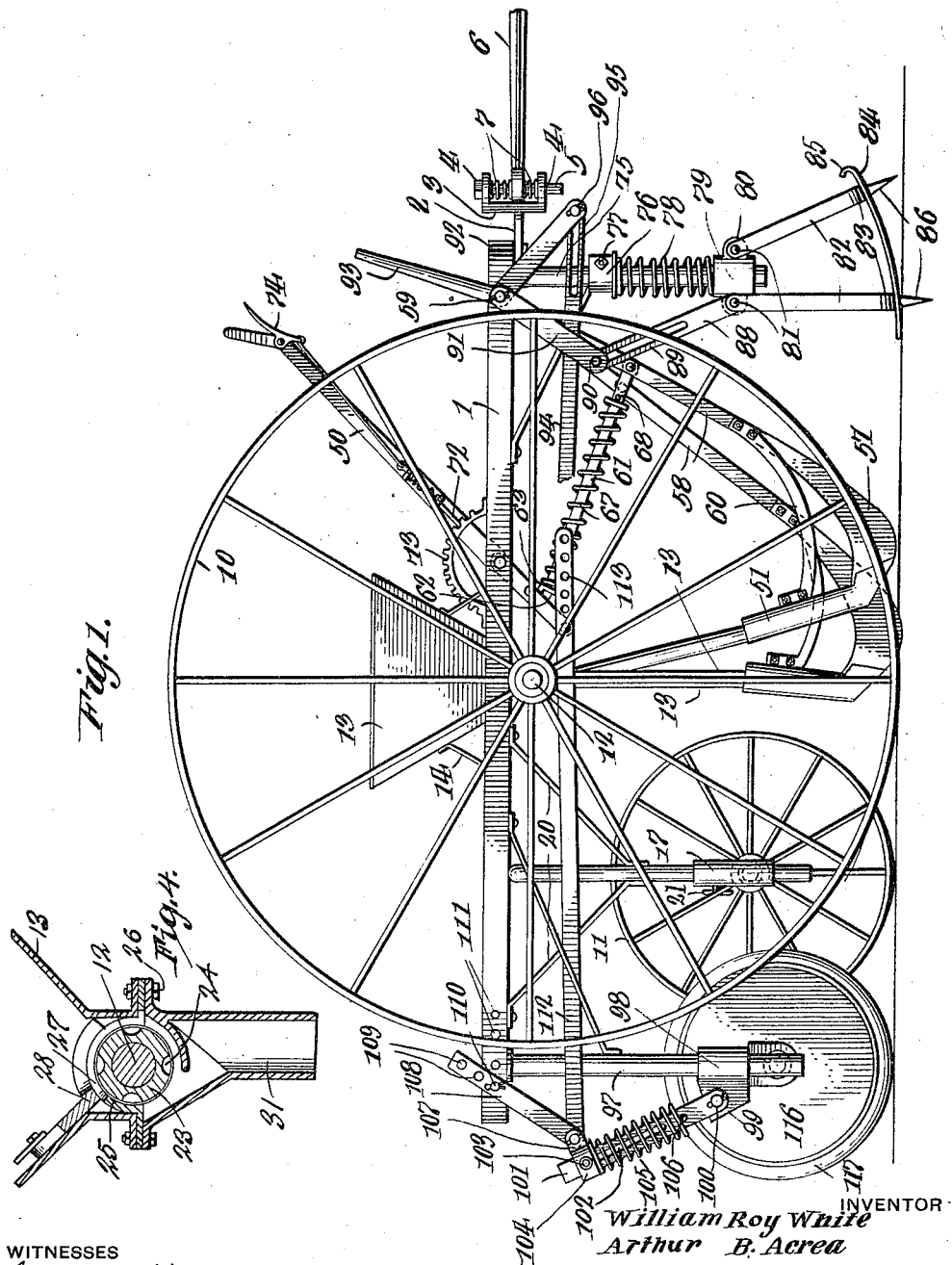

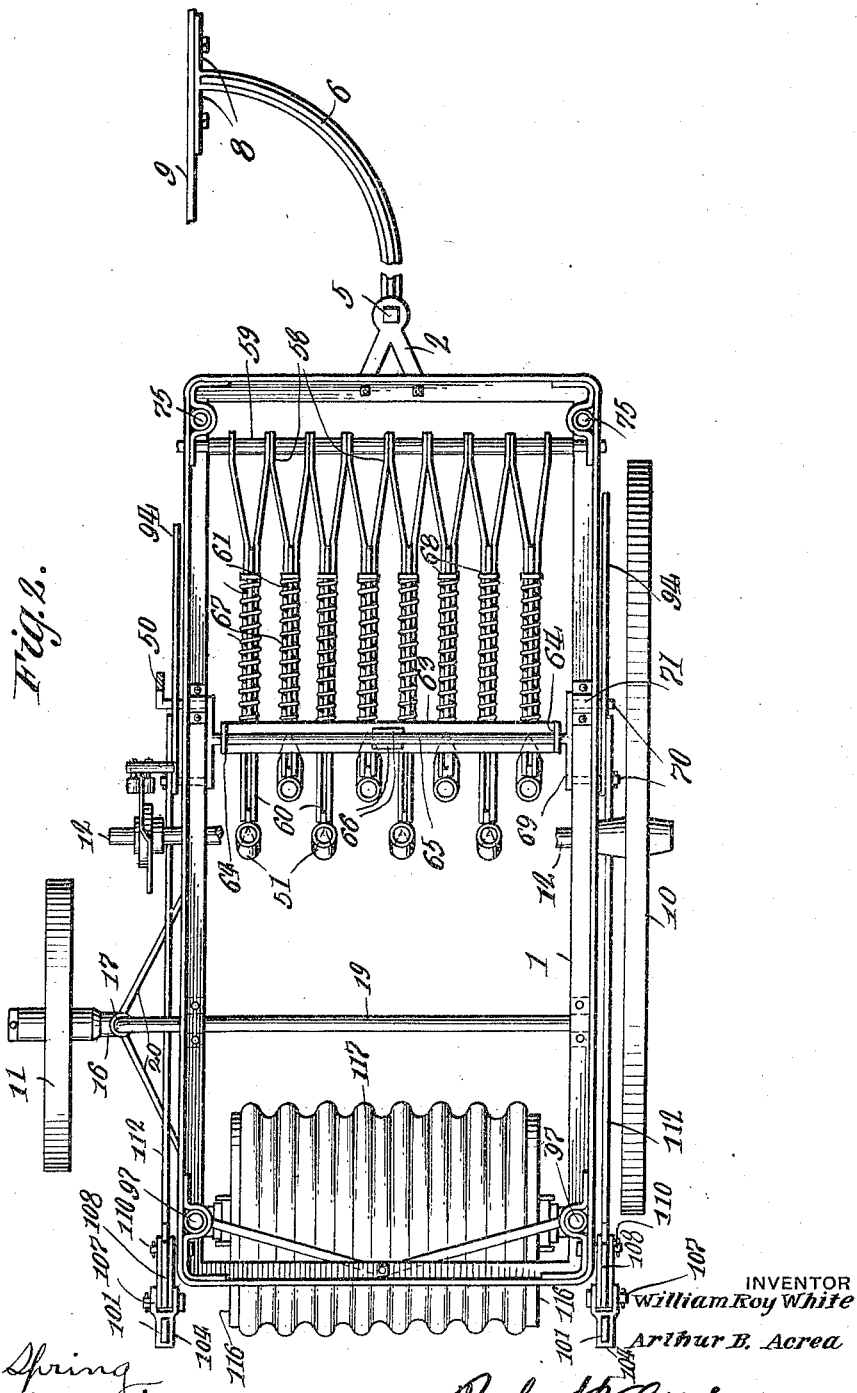

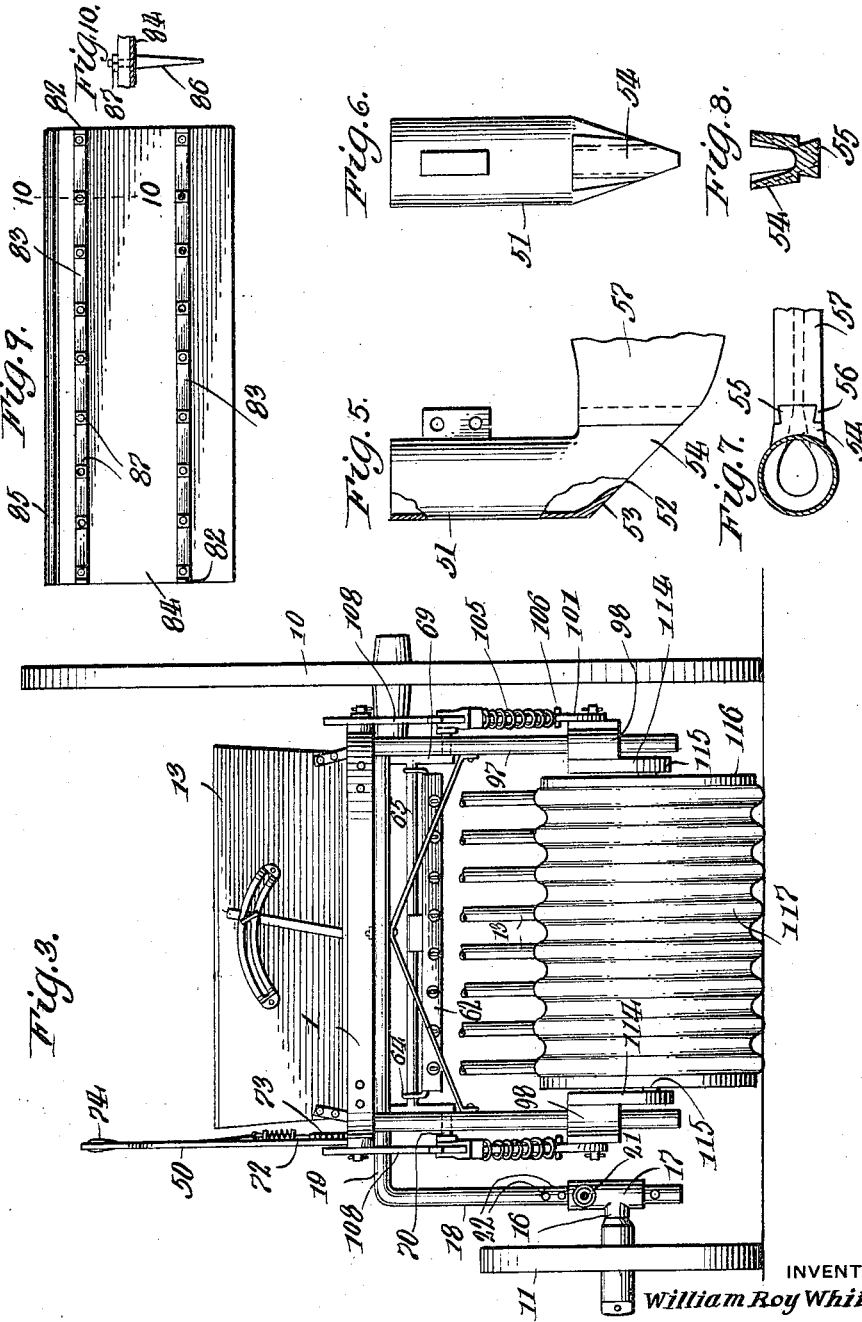

WILLIAM R. WHITE AND ARTHUR B. ACREA, OF FLEET, ALBERTA, CANADA.

COMBINED SEEDING AND CULTIVATING ATTACHMENT FOR PLOWS.

1,305,850. Specification of Letters Patent. Patented June 3, 1919.

Application filed November 13, 1916. Serial No. 131,168.

*To all whom it may concern:*

Be it known that we, WILLIAM R. WHITE and ARTHUR B. ACREA, subjects of the King of Great Britain, residing at Fleet, in the Province of Alberta and Dominion of Canada, have invented certain new and useful Improvements in Combined Seeding and Cultivating Attachments for Plows, of which the following is a specification.

This invention relates to certain new and useful improvements in a combined seeding and cultivating attachment for plows.

The primary object of the invention resides in the provision of an improved form of seed dropping mechanism which may be readily regulated and will be of simple construction and operation.

Another object of the invention resides in the provision of improved and novel means for controlling the position of the seed dropping tubes and shoes connected with the tubes and employed for forming the furrows or openings to receive seeds.

A further object of the invention resides in the provision of a combined seeding and cultivating attachment for a plow, in which all of the parts will be resiliently retained in operative position and may be readily adjusted independently of one another and thrown into operative and inoperative position by a single lever.

For a further object, the invention contemplates the provision of an attachment of this character, in which a feeding mechanism may be operated by rotation of the main wheel to control the feeding of the seeds to the tubes connected with the shoes, while the harrow mechanism and the dirt packing mechanism operate independently of and yet coöperate with the seeding mechanism, during the use of the plow with the attachment connected thereto.

For a still further object, the invention includes the provision of resilient supporting mechanism for the different parts carried by the frame of the attachment, whereby limited movement of either part may be permitted without interference with the operation of the remaining parts, the affected part being automatically returned to normal position.

The invention further contemplates the provision of an attachment of the above stated character, in which the various parts may be arranged in such manner upon the supporting frame as to be connected to and controlled by a single lever.

With these and other objects in view, as will appear as the nature of the invention is better understood, the same consists in the novel combination and arrangement of parts hereinafter more fully described, illustrated in the accompanying drawings and pointed out in the appended claims.

In the accompanying drawings forming a part of this application and in which like designating characters refer to corresponding parts throughout the several views:—

Figure 1 is a side elevation of the complete attachment with the operative parts in normal position.

Fig. 2 is a top plan view of the same.

Fig. 3 is a rear elevation.

Fig. 4 is a vertical section through the same.

Figs. 5, 6, 7 and 8 are detail views of the parts carried upon the lower ends of the seed dropping tubes.

Fig. 9 is a detail view of the harrow plate, and

Fig. 10 is a detail section on the plane of line 10—10 of Fig. 9, showing the manner in which the harrow teeth are secured to the harrow plate and suspending means for the latter.

Referring more in detail to the drawings, 1 designates the main frame which is preferably of rectangular form and constructed of angle iron. A suitable bracket 2 projects from the forward end of the main frame 1 and has a forked free end 3, in the arms 4 of which is positioned the vertical pin 5. The rear end of the connecting arm 6 is positioned upon the pin 5 with the shock absorbing springs 7 mounted above and below the same, around the pin 5 and bearing upon the opposite faces of said rear end of the arm 6 and upon the arms 4 of the bracket 2. This will permit raising and lowering of main frame 1 upon the arm 6. By referring to Fig. 2, it will be seen that the arm 6 is preferably curved and has its forward end provided with opposite extensions 8, which may be readily secured to the side frame member 9 of a plow or other agricultural implement, not shown.

The main frame 1 is supported upon the large drive wheel 10 on one side and the small guide wheel 11 upon its opposite side. The wheel 10 is mounted upon one end of the feed shaft 12 which extends transversely beneath the main frame 1 and is suitably mounted for rotation in the bottom of the seed containing hopper 13 which latter is supported in a suitable manner, as shown at 14, upon the main frame 1. It will be understood that the hopper 13 extends transversely of the frame 1 and that the shaft 12 rotates with the wheel 10.

The wheel 11 has its hub mounted upon a stub shaft 16, which has a vertical sleeve 17 formed upon one end for adjustment upon the depending portion 18 of the supporting rod 19, the main portion of which rod 19 is secured transversely beneath the main frame 1 and held in the brackets or brace members 20. The sleeve 17 carries a locking pin 21 which is removably engaged through the same and through one of the series of transverse openings 22 arranged in the lower part of the depending portion 18 of the rod 19, as clearly shown in Fig. 3. It will therefore be evident that the sleeve 17 may be readily adjusted vertically and secured in proper position to support the shaft 16 and guide wheel 11 in the proper horizontal plane, so that the main frame 1 may be practically level when the guide wheel 11 is riding in the land side of the furrow.

Mounted upon the seed shaft 12 within the hopper 13 is a sleeve 23 which is provided at suitable points throughout its length with seed receiving pockets 24. A plate 25 extends over this sleeve and forms the bottom of the hopper, the side edges of the plate being secured to the hopper as indicated at 26. This plate is of semi-circular form in cross section and is provided with transverse openings 27 through which the seed is admitted into the pockets 24 of the sleeve 23. In order however to regulate the amount or number of seeds to be introduced into the pockets 24 through the slots 27 I have provided an arcuate plate 28 which is positioned over the curved portion of the plate 25 and is provided with suitable transverse openings which may register with the openings 27 of said plate 25. This plate 28 is shorter than the hopper 13 and is adapted to move longitudinally therein so as to cover or uncover the openings 27 as desired. To operate this plate 28 a suitable connection may be provided therebetween and a main operating lever 50 to be later referred to. A plurality of flexible tubes 31 secured beneath the hopper and sleeve 23 are adapted to receive the seeds from the pockets 24 of said sleeve and to deposit the seeds upon the ground in the rear of the furrow opening elements connected with said tubes as later set forth. In this connection it will be noted that in operation rotation of the shaft 12 will cause the sleeve 23 to rotate and carry the seeds from the hopper 13 to the tubes 31 it being understood that adjustment of the plate 28 is first made to regulate the amount of seeds admitted into the pockets 24.

Slidably mounted upon the lower ends of the flexible tubes 13 are the sleeves 51, which have their lower ends 52 opened and inclined inwardly directed flanges 53 formed thereon, to reduce the size of the openings and also properly direct the seeds dropped from the same. Each sleeve 51 has an angular extension 54 formed upon its lower end and directed forwardly, the forward edge of the extension 54 being reduced and beveled, as shown at 55, for engagement in a dove-tail slot 56 provided for the same in the rear vertical edge of a shoe 57. The shoes 57 are formed upon the lower ends of the bars 58 which have their upper ends pivoted upon the forward supporting shaft 59, mounted in the frame 1. A brace rod 60 connects each rod 58 with the sleeve 51 supported upon the shoe 57 carried by said rod 58.

Pivoted to each rod 58 is a rod 61, which has its opposite end engaged through the depending edge 62 of the angle plate 63, the opposite edge of which is provided with a plurality of up-standing ears 64, through which is extended a supporting rod 65. A pair of clamping plates 66 are extended upwardly from the plate 63 and engaged against the opposite side portions of the supporting rod 65, to prevent independent swinging movement of the plate 63, as clearly shown in Fig. 2 of the drawings. The shock absorbing springs 67 are mounted upon each rod 61 and have one end bearing against the depending edge 62 of the plate 63 while their opposite ends bear against the stop pins 68 extended transversely through the lower or first mentioned end portions of said rods 61. It will be understood that the upper end of each rod 61 is provided with a suitable head to limit movement of the same through the plate 63, in one direction. The supporting rod 65 has a cross head 69 formed upon each end with outwardly directed upper and lower arms 70 formed adjacent the opposite ends of the same, the purpose of which will later appear. The upper arms 70 are rotatably mounted in the supporting brackets 71 mounted upon the longitudinal members of the main frame 1 and the lower end of the main operating lever 50, previously mentioned, is secured to one of said upper arms 70. It will therefore be evident that upon adjustment of the main lever 50, the position of the lower arms 70 may be readily changed and the incline of the cross heads 69 also varied, said cross heads 69 and all parts connected with the supporting rod 65 swinging upon the upper arms 70 of said cross heads 69. This also changes the position of the plate 63 and varies the adjustment of the shoes 57. The lever 50 is of conventional form and provided with the usual locking means 72 for engagement with the rack segment 73 mounted upon the main frame 1. It will be understood that the usual releasing finger 74 is mounted adjacent the end of the lever 50 and connected with the locking means 72 to withdraw the latter from the rack segment 73, when it is desired to change the adjustment of the lever 50.

Depending from the forward corners of the main frame 1, are the harrow supporting standards 75, upon which are adjustably mounted the collars 76, said collars 76 being preferably in the form of clamping collars secured in position by suitable clamping screws 77. Beneath each collar 76, is positioned a shock absorbing spring 78, upon the standard 75. Slidably mounted upon each standard 75, beneath the spring 78 carried by the same, is a collar 79 having outwardly directed ears 80 which carry pivot pins 81, which latter support the upturned ends 82 of the harrow plate carrying frames 83. A transversely curved harrow 84 is secured beneath the main or central portions of the frames 83 which, as will be understood, extend transversely of the main frame 1. The forward edge 85 of the harrow plate 84 is turned back, as clearly shown in Fig. 1 of the drawings. The conical harrow teeth 86 are secured to the bottom of the harrow plate 84 preferably by means of reduced and threaded shank portions which extend upwardly through the plate 84 and through the frames 83 to receive the nuts 87 or other securing members, as shown in Figs. 9 and 10 of the drawings.

Mounted upon one of the pivot pins 81 is a slotted arm 88, within the elongated longitudinal slot 89 of which is connected the pin 90 carried in the lower end of the arm 91, which is rigid with the arm 92 extended at right angles to the same and thereby forming a bell crank lever, the central portion of which is mounted upon and adapted to move with the shaft 59, previously mentioned. The shaft 59 is operated by the harrow adjusting lever 93 which has one end secured to the end of the shaft 59. It will be understood that the bell crank lever is provided for each end of the shaft 59 and connected, in the manner described, with one of the collars 79.

In order to adjust the harrow by operating the bell crank lever from the main lever 50, I provide the rod 94 which is connected with one of the lower arms 70, by one end, and has an elongated longitudinal slot 95 formed in its opposite end to receive the pin 96 carried in the lower end of the arm 92 of the bell crank lever, as will be readily understood by referring to Fig. 1 of the drawings. It will therefore be seen that upon adjustment of the main lever 50, in one direction, the rod 94 will be drawn rearwardly, thereby swinging the bell crank lever to raise the harrow plate 84 and teeth 86, against the tension of the spring 78. Upon movement of the lever 50 in the opposite direction, the rod 94 will be forced forwardly, permitting the spring 78 to act against the collar 79 and force the harrow plate 84 and teeth 86 downwardly. It will be readily seen that swinging movement of the frame 83 and plate 84 will be limited by engagement of the ends 82 of the frame 83 with the opposite sides of the collars 79. The slot 95 in the rod 94 permits independent adjustment of the harrow by means of the lever 93, if desired.

Depending from the rear corners of the main frame 1 are the roller supporting standards 97, upon which are slidably mounted the collars 98. The collars 98 have rear extensions 99 carrying pins 100, upon which are mounted the arms 101. Each arm 101 is provided with an elongated longitudinal slot 102, within which is adapted to ride a pin 103 carried by a collar 104 slidably mounted upon said arm 101. The pin 103 is retained at the upper end of the slot 102, by means of the spring 105 engaged around said arm 101 and having one end bearing against the under face of said collar 104 while its opposite end bears against a pin 106 secured through the lower portion of said arm 101, and extended upwardly and rearwardly and pivoted to forward extensions 107 of the collars 104, are the regulating arms 108 provided with a plurality of spaced openings 109 through which may be extended the supporting pins 110 which also extend through the proper openings 11 in the rear ends of the longitudinal members of the main frame 1. I also pivot adjusting rods 112 to the forward extensions 107 of the collars 104 and provide the forward ends of said adjusting rods 112 with the plurality of spaced openings 113, through which may be extended the lower arms 70 of the cross heads 69, previously mentioned. It will therefore be seen that upon adjustment of the main lever 50, the rod 112 will be moved forwardly and rearwardly, swinging the arms 108 upon the pins 110 and swinging the arms 101 upon the pins 100 and at the same time changing the position of the collars 98 upon the standards 97.

The collars 98 have depending portions 114 which reecive the stub shafts 115 projecting from the heads 116 of the transversely corrugated cylinder 117 which latter is preferably rolled from sheet metal or the like.

It will be evident that the springs 105 will absorb all shocks incident to engagement of the roller 117 with a stone or other obstruction.

From the foregoing description, it will be apparent that the position of the rollers 117 upon the standards 97 may be readily adjusted by means of the main lever 50 or independently of the same, as desired.

As the construction and operation of each and every part has been thoroughly and clearly described, it is believed that further detailed description will be unnecessary. Attention may be called to the fact, however, that all of the planting shoes and sleeves as well as the harrow or roller may be readily adjusted by a single movement of the main lever 50. The lever 40 may also be readily adjusted to regulate the discharge of the seeds or the like from the hopper 13 to the tubes 13 and planting sleeves 51 mounted upon the same.

While the form of the invention shown and described is what is believed to be the preferred embodiment thereof it is nevertheless to be understood that minor changes in the details of construction and arrangement of parts may be made therein, within the scope of the appending claims without departing from the spirit of the invention.

What we claim as new is:—

1. A combined seeding and cultivating attachment for a plow comprising a main frame, a seed hopper mounted upon said main frame, tubes depending from said hopper, sleeves adjustable upon said tubes and having reduced opened lower ends, planting shoes connected with said sleeves, means for suspending said shoes from said main frame, a main adjusting lever, connections between said main lever and said suspending means, forward standards depending from said main frame, a harrow mounted upon said standards, adjusting means for said harrow, connections between said adjusting means and said main lever, an independent adjusting lever connected with said adjusting means, a roller, rear standards depending from said frame to support said roller, means for adjusting said roller upon said rear standard, connections between the last mentioned adjusting means and said main lever, and means for locking said main lever in adjusted position.

2. A combined seeding and cultivating attachment for a plow comprising a frame, a hopper positioned upon said frame, planting tubes depending from said hopper, means for controlling the admission of seeds to said tubes, rods pivoted to said frame and having furrow producing members formed on their lower ends, sleeves connected with said members and slidably mounted upon said tubes, connections between said sleeves and said members, an adjusting lever pivoted to said frame, a swinging member mounted in said frame and connected with said lever, a plate carried by said swinging member, resilient connections between said plate and each of said rods, and means for locking said lever in adjusted position.

3. A combined seeder and planter comprising a frame, seed dropping means carried thereby, furrow opening elements connected with said seed dropping means and adjustably suspended from said frame, roller and harrow elements adjustably suspended from said frame, a transversely extending shaft equipped at its opposite ends with cross bars having the upper extremities thereof pivoted to the frame, means connected with said shaft to adjust said furrow opening element, means connected with the lower ends of said cross bars to adjust said roller and harrow elements, and a swinging lever rigid with said shaft to effect simultaneous adjustment of the furrow opening, roller and harrow elements.

4. In combination, a frame, seed dropping means carried thereby, furrow opening shoes connected with said seed dropping means and equipped with suspending rods having the upper ends thereof pivotally secured to said frame, a transversely extending shaft suspended from said frame and movable longitudinally thereof, a plate carried by said shaft and provided with a plurality of openings, a plurality of adjusting rods pivotally secured at one end to said shoe supporting rods and having the opposite ends thereof extended through the openings in said plate, springs surrounding said adjusting rods and engaging said plate to resist movement of the rods through said openings, and an operating lever connected with said rod to move the plate along the length of the adjusting rod against the tension of said spring for the purpose of adjusting said shoes.

5. In combination, a frame, seed dropping means carried thereby, standards depending from the forward and rearward corners of the frame, vertically adjustable collars supported on said standards, a harrow carried by the forward collars, a roller carried by the rearward collars, a main operating lever, and connections between said lever and collars adapted to move the latter longitudinally of said supporting standards to effect simultaneous adjustment of the harrow and rollers.

6. In combination a frame, seed planting means carried by the frame and including vertically adjustable furrow opening shoes, standards depending from the forward and rearward corners of the frame, vertically adjustable collars mounted on said standards, a harrow supported by the forward collars, a roller supported by the rearward collars, a main operating lever supported by said frame, and connections extending from said lever to effect simultaneous adjustment of said furrow opening shoes, harrow and roller elements.

7. In combination, a frame, seed dropping means carried thereby, standards depending from the forward and rearward corners of the frame, a harrow supported for vertical adjustment upon the forward standards, a roller supported for vertical adjustment upon the rearward standards, reciprocating adjusting rods mounted beneath the frame for movement in a longitudinal direction, connections between said harrow and adjusting rods at the forward end of the frame adapted to move the harrow longitudinally of the forward supporting standards, similar connections between the roller and said adjusting rods at the rear end of the frame, and a single lever operatively connected with said adjusting rods to impart reciprocating movement thereto.

8. The combination of a frame, seed dropping means carried thereby, standards depending from the forward and rearward corners of the frame, a harrow provided for vertical movement by said forward standards, a roller guided for vertical movement by said rearward standard, supporting connections between the forward end of the frame and said harrow adapted to effect vertical adjustment of the latter, reciprocating rods extending rearwardly from said supporting connections, similar supporting connections between the rear end of the frame and said roller, reciprocating rods extended forwardly from said last mentioned supporting connections, and a single lever operatively connected with said adjusting rods to effect adjustment of said roller and harrow.

9. The combination of a frame, seed dropping means carried thereby, a shaft extending transversely beneath the frame, cross pieces carried by the ends of said shaft having the upper extremities thereof pivoted to the frame and the lower extremities thereof free to swing, supporting standards suspended from the forward and rearward corners of said frame, collars mounted for vertical movement on said frame, a harrow carried by the forward collars, a roller carried by the rearward collar, pivoted supporting links extending upwardly from said collars, corresponding pivoted links extending downwardly from the frame adjacent the forward and rearward ends thereof, and adjustably connected with said first mentioned links, reciprocating rods extending forwardly from the supporting links at the rear end of the frame and connected with the lower extremities of said cross pieces, reciprocating rods extending rearwardly from the supporting links at the forward end of the frame and also connected with the lower extremities of said cross piece, a lever carried by said shaft to permit actuation thereof.

In testimony whereof we affix our signatures in presence of two witnesses.

WILLIAM R. WHITE.
ARTHUR B. ACREA.

Witnesses:
　IRENE GUNN,
　DOMINIC McHUGH.

Copies of this patent may be obtained for five cents each, by addressing the "Commissioner of Patents, Washington, D. C."